(12) United States Patent
Chen (10) Patent No.: US 6,784,929 B1
(45) Date of Patent: Aug. 31, 2004

(54) UNIVERSAL TWO DIMENSIONAL (FRAME AND LINE) TIMING GENERATOR

(75) Inventor: Tai-Ming Chen, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/378,183

(22) Filed: Aug. 20, 1999

(51) Int. Cl.[7] .................... H04N 5/235; H03K 23/66
(52) U.S. Cl. .............. 348/230.1; 348/312; 348/317; 377/52; 377/57; 377/63; 345/213; 345/545
(58) Field of Search .................. 348/312, 230.1, 348/317; 377/63, 52, 57; 345/213, 545

(56) References Cited

U.S. PATENT DOCUMENTS

| | | | |
|---|---|---|---|
| 4,280,138 A | | 7/1981 | Stock |
| 4,454,545 A | | 6/1984 | Duschl |
| 4,723,169 A | * | 2/1988 | Kaji ........................... 348/257 |
| 5,040,057 A | * | 8/1991 | Gilblom et al. ............... 348/88 |
| 5,229,857 A | * | 7/1993 | Taniji ......................... 348/305 |
| 5,402,173 A | * | 3/1995 | Noguchi et al. ............ 348/322 |
| 5,452,004 A | * | 9/1995 | Roberts ...................... 348/301 |
| 5,557,335 A | * | 9/1996 | Oh ............................. 348/512 |
| 5,581,303 A | * | 12/1996 | Djabbari et al. ............ 348/524 |
| 5,659,359 A | * | 8/1997 | Mochizuki et al. ......... 348/296 |
| 5,828,407 A | * | 10/1998 | Suzuki ........................ 348/312 |
| 5,841,430 A | * | 11/1998 | Kurikko ...................... 345/213 |
| 5,841,471 A | | 11/1998 | Endsley et al. |
| 5,850,215 A | * | 12/1998 | Kamiya et al. ............. 345/204 |
| 5,982,428 A | * | 11/1999 | Charneski et al. .......... 348/312 |
| 6,005,618 A | * | 12/1999 | Fukui et al. ................ 348/296 |
| 6,075,565 A | * | 6/2000 | Tanaka et al. .............. 348/312 |
| 6,122,000 A | * | 9/2000 | Yee et al. ..................... 348/51 |
| 6,124,889 A | * | 9/2000 | Landowski ................. 348/312 |
| 6,204,879 B1 | * | 3/2001 | Koseki et al. ........... 348/230.1 |
| 6,271,821 B1 | * | 8/2001 | Sung et al. ................... 345/98 |
| 6,295,045 B1 | * | 9/2001 | Furuhashi et al. ........... 345/99 |
| 6,313,822 B1 | * | 11/2001 | McKay et al. .............. 345/698 |
| 6,320,575 B1 | * | 11/2001 | Terashima et al. ......... 345/213 |
| 6,323,849 B1 | * | 11/2001 | He et al. ..................... 345/204 |
| 6,329,982 B1 | * | 12/2001 | Lee ............................. 345/211 |
| 6,509,927 B1 | * | 1/2003 | Prater et al. ............. 348/222.1 |
| 6,580,456 B1 | * | 6/2003 | Jacobs ......................... 348/312 |

FOREIGN PATENT DOCUMENTS

| | | | | |
|---|---|---|---|---|
| FR | 2572609 A1 | * | 5/1986 | ........... H04N/5/33 |
| JP | 06098297 A | * | 4/1994 | ........... H04N/5/94 |

* cited by examiner

Primary Examiner—Andrew Christensen
Assistant Examiner—Brian Genco
(74) Attorney, Agent, or Firm—Fish & Richardson P.C.

(57) ABSTRACT

A programmable two-dimensional timing generator according to the invention employs a clock generator (102) and a user-defined two-stage waveform generator (106, 108). A single static random access memory (SRAM) (112) stores a user-defined waveform control word for both waveform generator control units. The SRAM data is entered via the host controller external data bus. A single waveform control word may be used to control both waveform generators.

25 Claims, 5 Drawing Sheets

Timing Generator System Block Diagram

UNIVERSAL TWO DIMENSIONAL (FRAME AND LINE) TIMING GENERATOR

BACKGROUND OF THE INVENTION

1. Field of the Invention

The present invention relates to timing generators, and in particular to timing generators for use in imaging devices.

2. Description of the Related Art

Two-dimensional devices like area sensors or display devices typically require timing both for line read out and frame read out. Because of complexities required in the frame (2D) timing, a single timing generator for both the line (1D) and frame (2D) timing has typically not been used. Instead, typically, one timing generator is employed for the frame read out and another timing generator is employed for the line read out. In such devices, therefore, separate control memories are required for each timing generator's control words.

Accordingly, there is a need for an improved method for generating signaling for a two-dimensional device.

SUMMARY OF THE INVENTION

These and other disadvantages of the prior art are overcome in large part by a two-dimensional timing generator according to the present invention. In particular, a programmable two-dimensional timing generator according to the invention employs a clock generator and a user-defined two-stage waveform generator. A single static random access memory (SRAM) stores a user-defined waveform control word for both waveform generator control units. The SRAM data is entered via the host controller external data bus. A single waveform control word may be used to control both waveform generators.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 7:
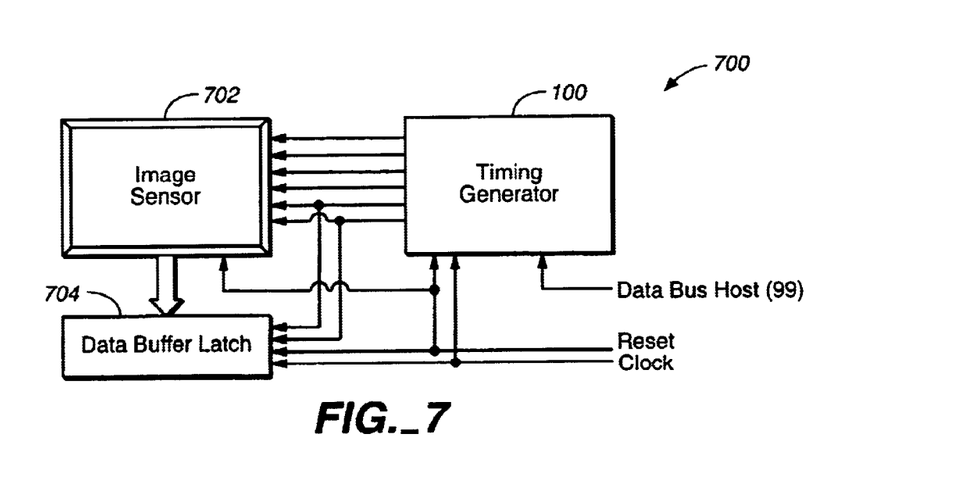
FIG. 7 is a diagram of an exemplary image sensing system employing a timing generator according to an embodiment of the invention.

Turning now to the drawings, and with particular attention to FIG. 7, an exemplary image sensing system 700 according to an embodiment of the invention is shown. The image sensing system 700 includes a timing generator 100 according to the present invention, and a known image sensor 702 and data buffer latch 704. Typically, the image sensing system 700 is embodied in a computer add-on or expansion board. A host central processing unit (CPU) 99 provides a reset and clock signal to the image sensing system 700, as well as control data via a data bus. As is known, the image sensor 702 captures an image, which is then buffered in the data buffer latch 704. The timing generator 100 according to the invention provides line and frame timing for the image sensor 702.

Figure 1:
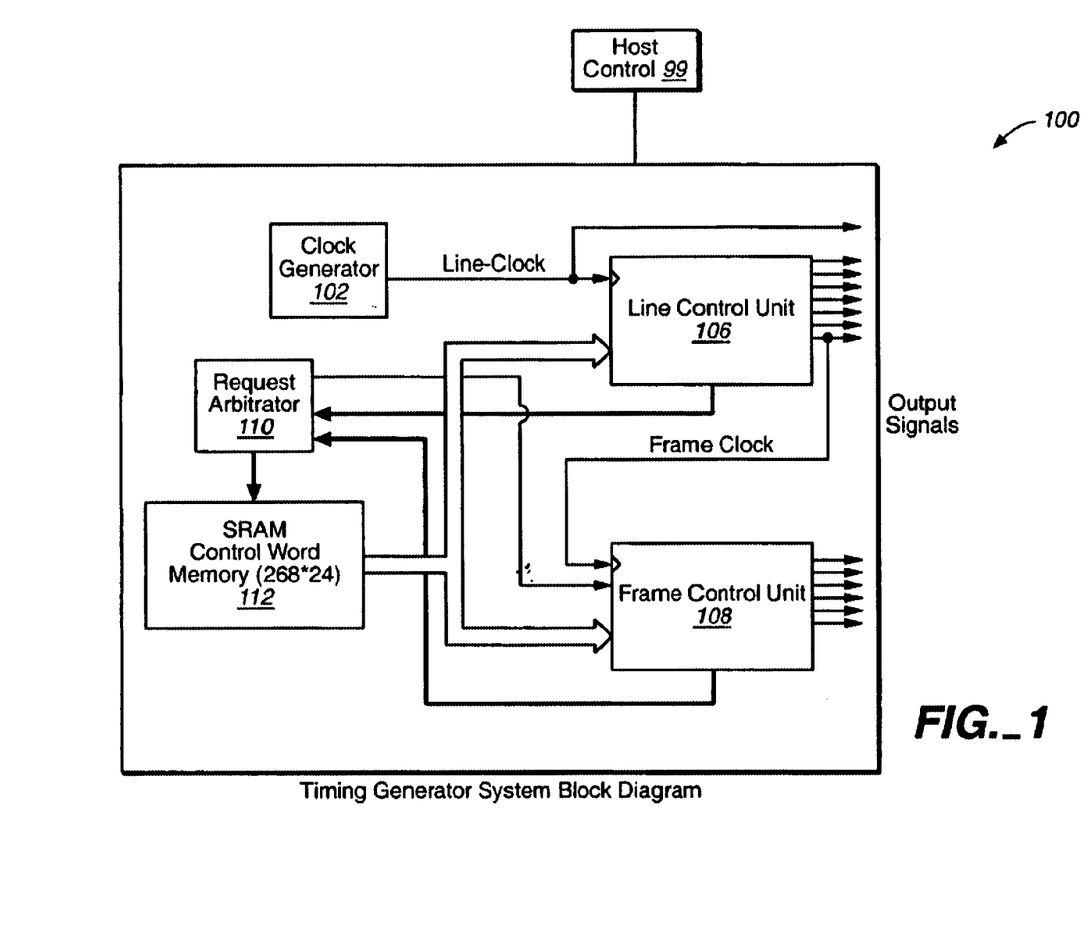
FIG. 1 is a block diagram illustrating a timing generator system according to an embodiment of the present invention.

FIG. 1 illustrates a universal two-dimensional (2-D) timing generator 100 according to an embodiment of the present invention. As noted above, the universal 2-D timing generator 100 according to the invention is typically embodied as part of an imaging add-on board or system, coupled to or within a host computer or CPU 99. The host computer 99 may be a PC or PC-compatible computer, with a Pentium or other x86 type processor.

The universal 2-D timing generator 100 includes a line control unit 106 and a frame control unit 108. A clock generator 102 provides a line clock to the line control unit 106. A request arbitrator 110 is provided to arbitrate requests between the line control unit 106 and the frame control unit 108. A static random access memory (SRAM) 112 for storing the control word is also provided.

The line control unit 106 generates a lower level waveform as a first stage waveform based on a line clock input from the clock generator 102. The line control unit 106 produces highly repeateable timing cycles, such as used for line timing in CCD (charge coupled device) sensors. In addition, one of the output signals from the line control unit 106 is provided as a frame clock control to the frame control unit 108 to generate a second stage waveform, which has many repeating line signals, and which may be used, for example, for an area sensor or display device (such as a CMOS image sensor or Kopin display). The frame control unit 108 and the line control unit 106 additionally receive inputs from and provide requests to a request arbitrator 110. The request arbitrator 110 provides an output to the SRAM control word memory 112, which in turn, sends the appropriate request to the line control unit 106 or the frame control unit 108 depending on when the timing is desired.

Figure 2A:
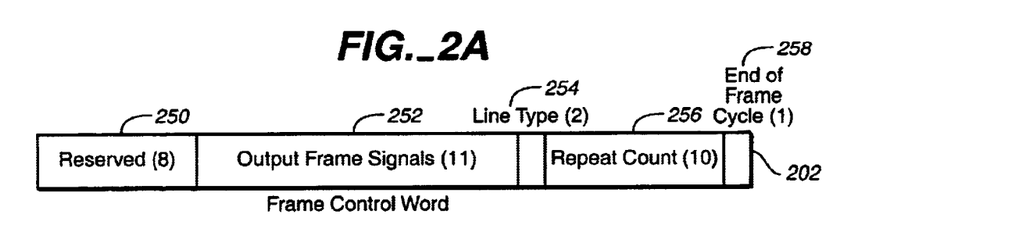
FIG. 2A and FIG. 2B illustrate a data format of the user-defined waveform control words.
Figure 2B:
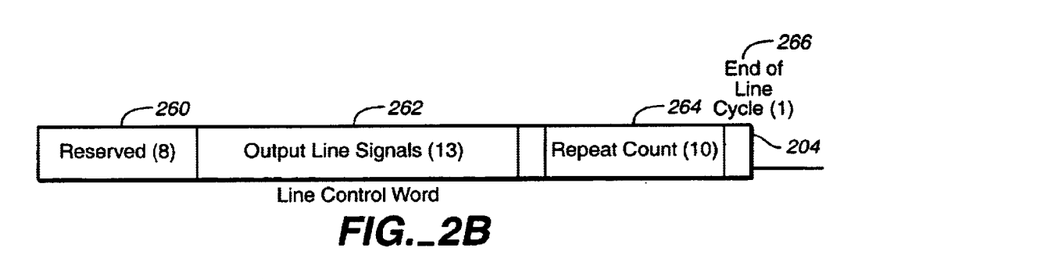

More particularly, the SRAM data is illustrated in FIG. 2. A frame control word 202 and a line control word 204 are illustrated. For higher level control, the frame control word 202 is employed. The frame control word 202 defines one state of frame timing. As can be seen, the frame control word 202 includes a reserve byte field 250, an output frame signals field 252 (11 bits), a line type field 254 (2 bits), a repeat count field 256 (10 bits), and an end of frame field 258 (1 bit). The output frame signals field 252 represents the level of the output signals. The repeat count field 256 represents the state of the previous output in units of clock cycles up to 1024 frame cycles. The line type field 254 is used to select the type of line waveform to be used within the frame. The end-of-frame field 258 defines the end of one complete frame cycle. Once this bit is marked as one after the state is completed, it either goes back to the start of the frame or the process is terminated.

The line control word 204 is similar. The line control word 204 includes an output line signals field 262, a repeat count field 264, and an end of line cycle field 266. In this instance, the output line signals field 262 is 13 bits (i.e., there is no line type field).

Within the output signals fields (252, 262) of both data frame formats a few signals are preassigned. Bit 11 of the line control word 204 is defined as the frame clock. This signal marks a complete cycle of line signals. Raising this signal ticks the frame control unit, as will be discussed in greater detail below.

Figure 3:
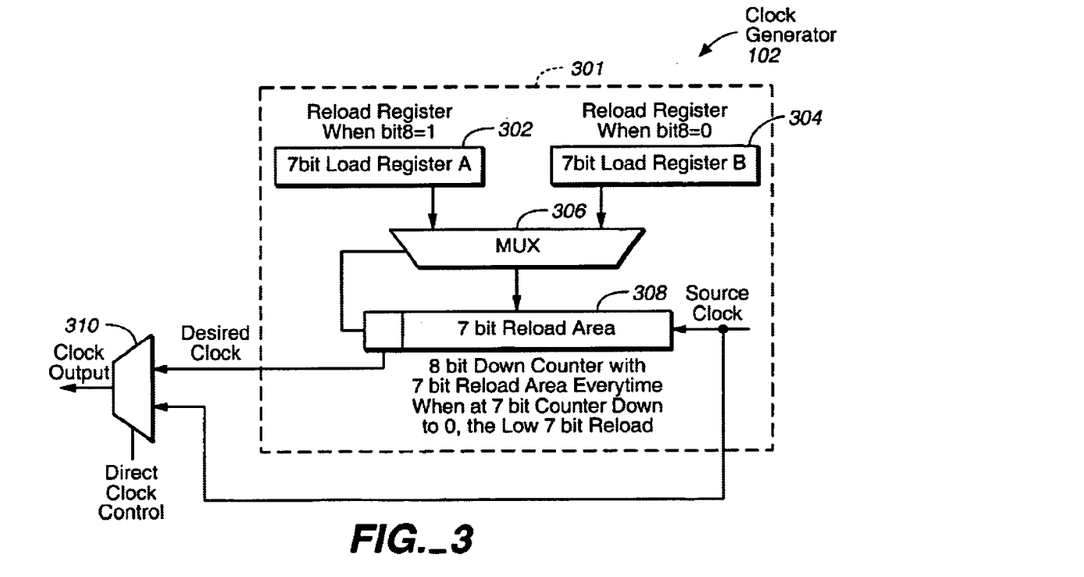
FIG. 3 illustrates a programmable clock generator according to an embodiment of the present invention.

Turning now to FIG. 3, a diagram of the clock generator 102 is shown. In particular, the clock generator 102 includes a clock divider 301 and a switching multiplexer 310. The clock divider 301 includes a first 7-bit load register 302 and a second 7-bit load register 304, a multiplexer 306 and a counter 308. The outputs of the load registers 302, 304 are provided to the multiplexer 306, which in turn provides an output to the reload counter 308. The reload counter 308 receives a source clock and includes a 7-bit reload area. Each time all seven bits of the counter count down to zero, the seven bits are reloaded and a clock is output to the switching multiplexer 310. That is, the eighth bit changes level when the seven bits go under flow, and the lower 7-bits are reloaded from the register 302 or 304 in order define a clock signal with different duty cycles. In particular, the register 302 is reloaded when the eighth bit is 1, and the register 304 is reloaded when the eighth bit is 0. The switching multiplexer 310 is controlled to choose between a direct clock (i.e., the source clock), or the desired clock from the $8^{th}$ bit of the counter 308.

Figure 4:
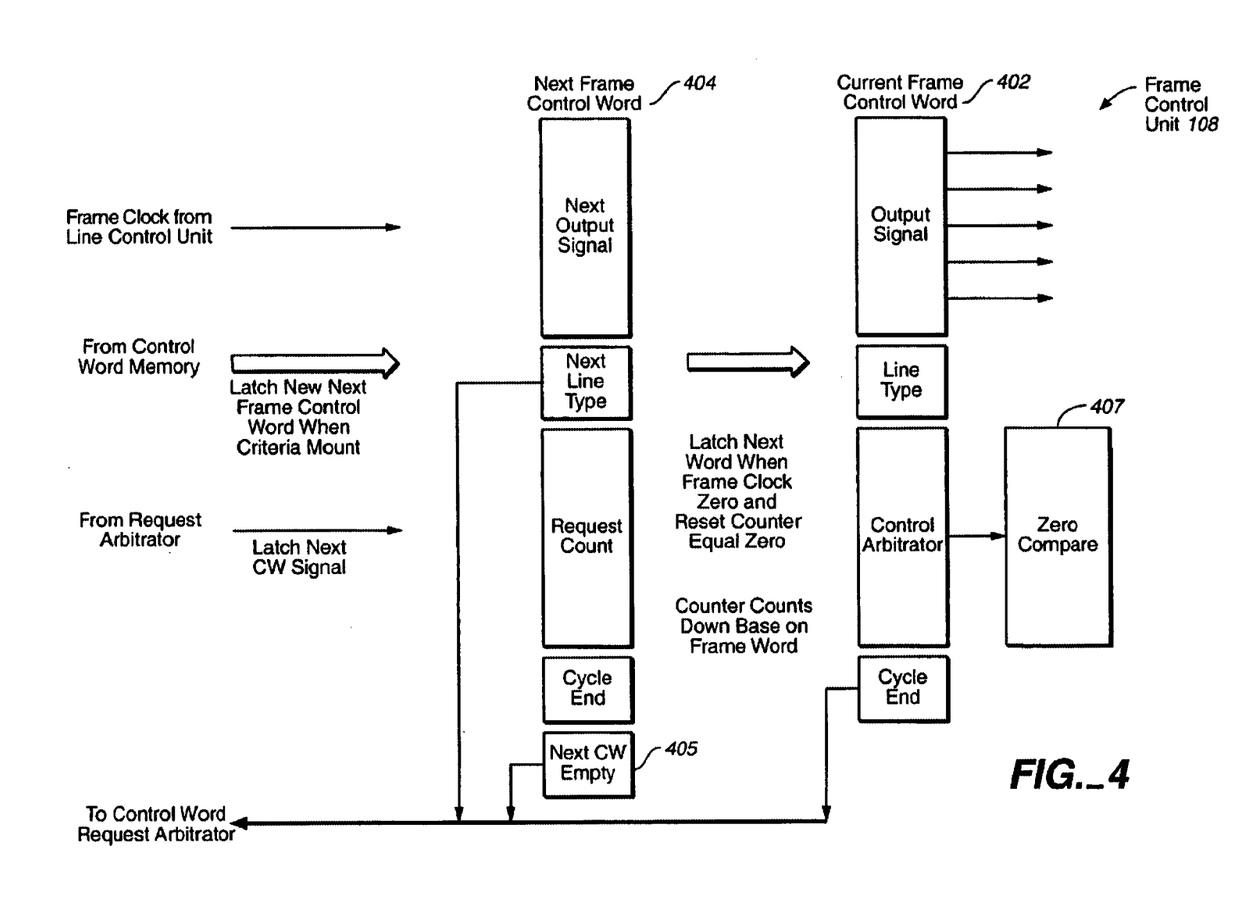
FIG. 4 illustrates an exemplary frame control unit according to an embodiment of the present invention.

The frame control unit 108 is illustrated in FIG. 4. In particular, the frame control unit 108 includes a register 404 and a register 402. The frame control unit 108 receives as inputs the frame clock from the line control unit 106, the control word from the SRAM 112, and a latch signal from the arbitrator 110 when the next control word is to be latched. The register 404 stores the "next" frame control word, and the register 402 contains the current frame control word. The current frame control word register 402 directly drives eleven output signals. The next frame control word register 404 stores the next frame control word which is pre-fetched from the SRAM 112 (FIG. 1) within the previous line timing waveform. The next frame control word 404's next line type field and next control word empty register 405, and the current frame control word's cycle end field, provide outputs to the request arbitrator 110, as will be explained in greater detail below.

The empty register 405 represents the emptiness of the next frame control word register 404 (i.e., that it has loaded to the current frame control word 402). The cycle end bit of the current frame control word is also sent to the arbitrator 110, so that the arbitrator 110 can identify which control word should be picked as the next one. Two line-type bits from the next frame control word are also sent to the arbitrator 110 to help the arbitrator 110 decide which line control word should be sent to the line control unit.

The control word memory request arbitrator 110 decides when it is available for the frame control unit 108 to access the SRAM 112. The frame control unit 108 is allowed to change state at the same time the line control unit 108 accesses the SRAM 112 to change state. This buffering allows a certain degree of parallelism, though at least one free cycle of line-timing waveform may be needed to obtain the pre-fetched frame control word. The frame control unit 108 updates the current frame control word with the next frame control word when the frame clock tick and repeat counter reach zero as determined by the zero compare unit 407. The update also sets the next control word empty field register 405.

Figure 5:
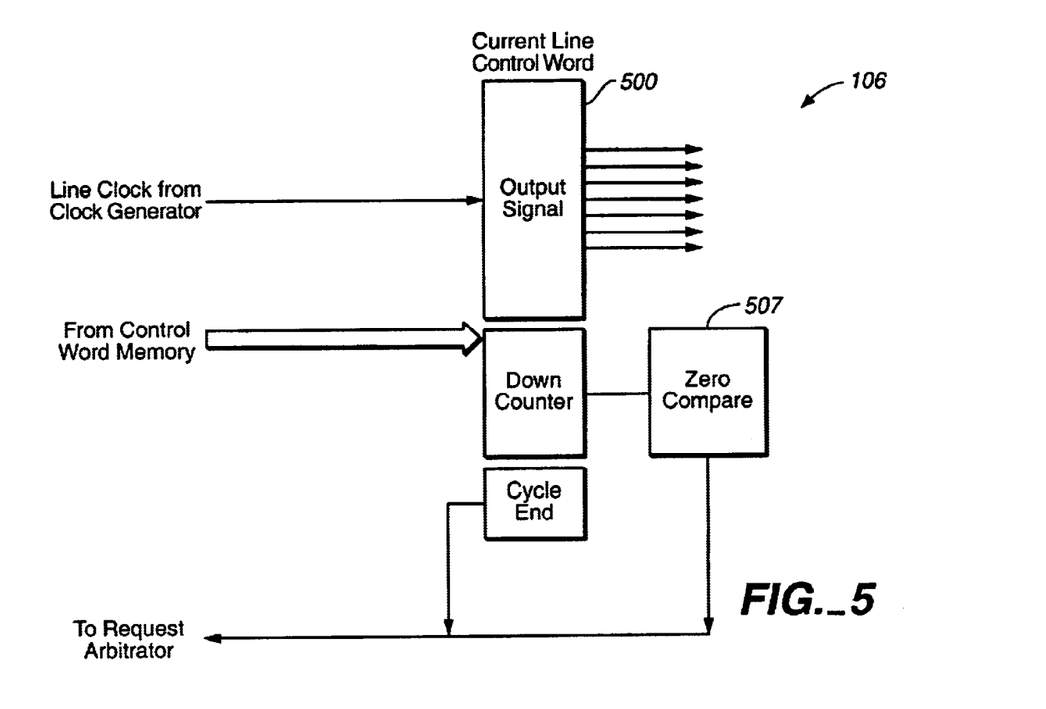
FIG. 5 illustrates an exemplary line control unit according to an embodiment of the present invention.

The line control unit illustrated in FIG. 5 is generally similar to the frame control unit 108 of FIG. 4. The line control unit 106 receives as inputs a line clock from the clock generator 102 and the line control word from the SRAM 112. The line control unit 106 includes a single current line control word register 500 and sends thirteen (13) output signals instead of eleven (11). In addition, the line control unit 106 does not include line-type bits.

The line control unit 106 provides as outputs to the arbitrator cycle end bit. The comparison result of checking if the repeat counter equals zero is also sent to the arbitrator 110 to see if the line control unit 106 needs the SRAM 110 immediately or not. The line control unit 106 has high priority access to the control word memory 112. The line control unit 106 loads a new control word every time the down counter goes under flow. The request arbitrator 110 decides which control word should be fetched.

Figure 6:
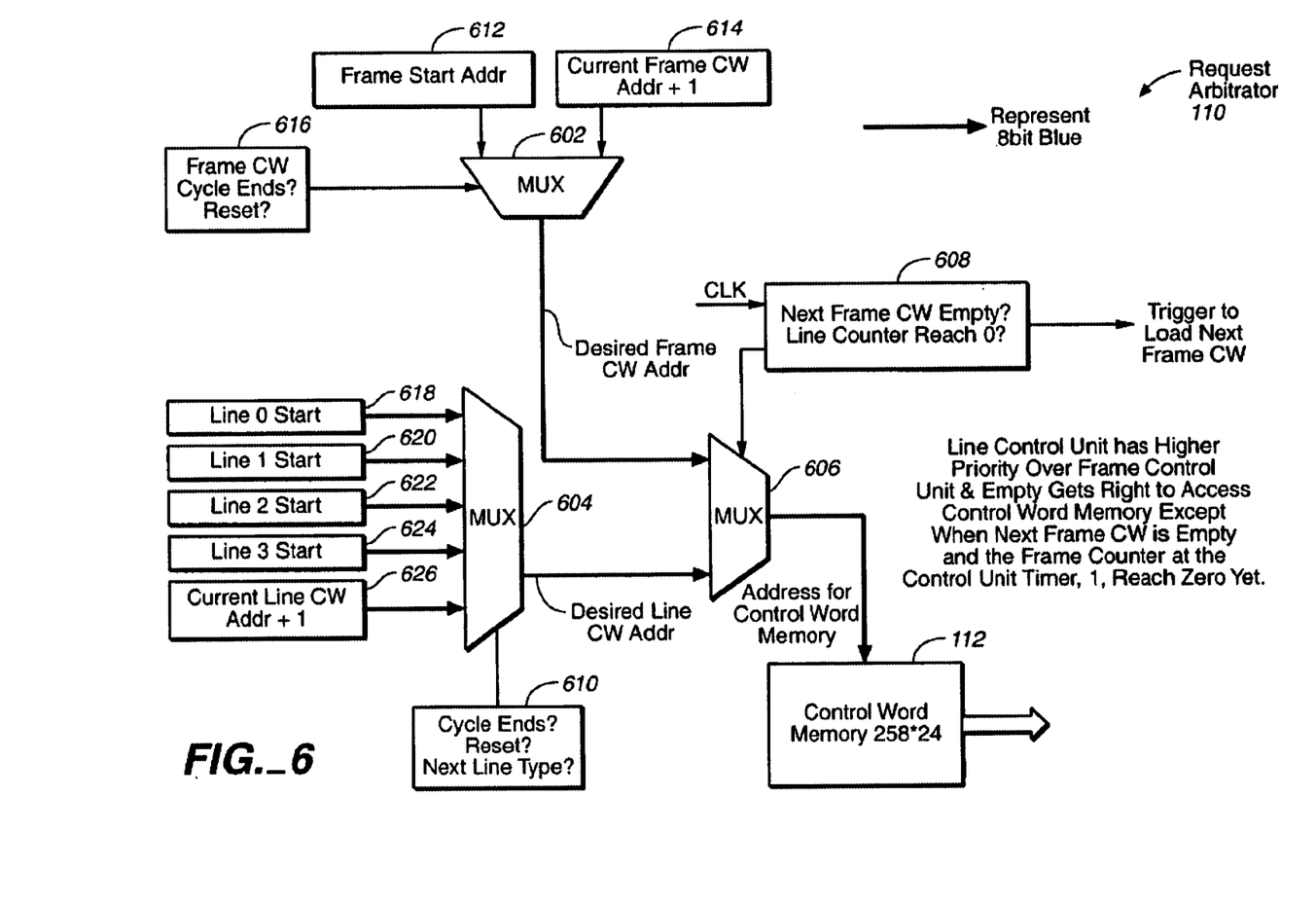
FIG. 6 illustrates an exemplary arbitration control unit according to an embodiment of the present invention.

The request arbitrator 110 is illustrated in greater detail in FIG. 6. The arbitrator 110 includes a frame address select multiplexer 602 configured to receive as inputs the contents of a frame start address register 612 and a current frame control word address +1 register 614. Selection is based on a control 616 depending on whether a frame cycle has ended or a reset has occurred. The output of the frame address select multiplexer 602 is provided to a line-frame address select multiplexer 606. The other input to the line-frame address select multiplexer 606 is the output of a line address select multiplexer 604. The line address select multiplexer 604 receives the outputs of five registers: a line 0 start address register 618; a line 1 address select register 620; a line 2 start address register 622; a line 3 address select register 624; and a current line +1 register 626. Selection is based on a control 610 depending on whether (i) a cycle has ended; (ii) system is reset; or (iii) a next line type is received.

As can be appreciated, the line-frame select address multiplexer 606 provides as an output an address of a line control word or a frame control word to the SRAM 112. Selection of a line control word address or a frame control word address is based on a control 608 and on whether the next frame control word is empty and the line counter has reached zero. The control 608 also causes loading of the next frame control word register.

Table 1 summarizes the register inputs:

TABLE 1

| REGISTERS | | | |
|---|---|---|---|
| REGISTER NAME | R/W (HOST) | BIT | DESCRIPTION |
| Line-clock low cycle | R/W | Bit [6 . . . 0] | Line-clock low cycle count (reload register A) |
| Line-clock high cycle | R/W | Bit [6 . . . 0] | Line-clock high cycle count (reload register B) |
| Frame start address | R/W | Bit [7 . . . 0] | Control word address point to start of frame (default 0) |
| Next Frame CW pointer | R | Bit [7 . . . 0] | Next frame CW address (reset to 0) |
| Line 1 start address | R/W | Bit [7 . . . 0] | Line 1 address pointer for line 1 start address |
| Line 2 start address | R/W | Bit [7 . . . 0] | Line 2 address pointer for line 2 start address |
| Line 3 start address | R/W | Bit [7 . . . 0] | Line 3 address pointer for line 3 start address |
| Line 4 start address | R/W | Bit [7 . . . 0] | Line 4 address pointer for line 4 start address |
| Next line CW pointer | R | Bit [7 . . . 0] | Next line CW address |

As can be appreciated, the line control unit 106 always gets higher priority to access the control word memory. On the other hand, the frame control unit 108 has lower priority, but does have a buffer to pre-fetch the next frame control word. Since frame control words change much less frequently than the line buffer, as long as there is one free cycle in the line waveform, the frame control unit will get its next control word pre-fetched. In particular, to pre-fetch the next frame control word, the next frame control word buffer must be empty and the down counter in the line control unit 106 can't be zero. That is, the current line control word is still down counting, and the next line control word is not needed immediately.

In addition, a timing generator control register is provided, to control operation of the timing generator of the present invention. The register is illustrated in Table 2, below:

TABLE 2

TG CONTROL REGISTERS

| TG CONTROL REGISTER | R/W (HOST) | BIT | DESCRIPTION |
|---|---|---|---|
| TG run | R/W | Bit 0 | 1 let Line-clock runs and 0 stops clock |
| Direct clock | R/W | Bit 1 | 1 enable direct clock source to line-clock |
| CW memory access | R/W | Bit 2 | 0 for host and 1 for internal access CW memory |
| Frame repeat enable | R/W | Bit 3 | 1 enable frame repeat after end cycle bit encountered |
| TG standby bit | R/W | Bit 4 | Write 1 will help initialize TG, but always reads 0 |

As noted above, the timing generator according to the present invention may be part of the image sensor system shown in FIG. 7. In such a case, the sensor module reset (RESET) also resets the timing generator sub-module 100. When it resets, the timing generator control register loads as 0bxxxxx000 (clock stop, host access to CW memory, frame won't repeat). It also sets the next frame control word as empty. The remaining registers remain the same. The control registers and control word memory are loaded before usage of the timing generator according to the present invention. All registers and the control word memory 112 can be read/write by the host control 99 without turning on the timing generator clock. As can be appreciated, there might be an access conflict between the host control unit 99 and the timing generator 100 over control word memory. Consequently, a switch in the host interface register decides who has the access to the control word memory (timing generator only reads control word memory). Then the host control unit 99 fills in the control word memory and registers as needed.

In addition, the host control unit 99 performs several operations to prepare the timing generator for work. It turns control word memory to internal access only and write 1 to TG standby bit. Writing 1 to the CW memory access bit will disconnect the access channel from host to CW memory, so typically, all control word memory accesses are finished before turning on this bit.

Writing 1 into the TG standby bit loads the Next Frame CW pointer with Frame Start address. It also sets the next frame buffer to empty bit on, frame cycle ends bit off, and frame down counter equal to 0. For the line control unit, the line CW pointer will be loaded with line 0 start address and it also sets line cycle end bit off and line down counter equal to 0.

After that is done, the host control 99 can turn on the line-clock by writing 1 to the TG run bit. As soon as first line-clock pulse reaches line control unit, the control word pointed by next line CW pointer (line 0 start address) will be loaded and executed. Whenever there is a free cycle in line control unit to CW memory, the frame start control word will be loaded into the next frame control word buffer and get armed. As soon as the first rising edge of frame clock is generated by the line control unit reach frame control unit, the frame starting control word will be loaded and executed. After that, the timing generator runs by itself.

What is claimed is:

1. A timing generator for an imaging system, characterized by:
   a line control unit configured to generate a first timing waveform for line read out of image data from an image sensor;
   a frame control unit coupled to the line control unit and configured to generate a second timing waveform for frame read out of image data from an image sensor, the frame control unit including a next frame control word register and a current frame control word register, the next frame control word register to buffer a next frame control word, the current frame control word register to buffer a current frame control word;
   a clock generator configured to provide a clock signal to the line control unit;
   a request arbitrator configured to arbitrate timing requests between the line control unit and the frame control unit based on an input; and
   a control word memory coupled to the request arbitrator and configured to provide a line control word to the line control unit or a frame control word to the frame control unit depending on an output from the request arbitrator, the line control word and the frame control word to control the first timing waveform and the second timing waveform, respectively,
   wherein the next frame control word register and the current frame control word register provide the input.

2. A timing generator according to claim 1, wherein the line control word for the line control unit and the frame control word for the frame control unit are of a same size.

3. A timing generator, characterized by:
   a line control unit configured to generate a first timing waveform;
   a frame control unit coupled to the line control unit and configured to generate a second timing waveform;
   a clock generator configured to provide a clock signal to the line control unit, the clock generator including first and second reload registers coupled to provide inputs to a multiplexer, the multiplexer providing an output to a down counter, the down counter coupled to provide a clock output;
   a request arbitrator configured to arbitrate timing requests between the line control unit and the frame control unit; and
   a control word memory coupled to the request arbitrator and configured to provide a control word to the line control unit or the frame control unit depending on an output from the request arbitrator.

4. A timing generator according to claim 1, wherein a portion of the next frame control word register and a portion of the current frame control word register is used to provide the input.

5. A timing generator according to claim 1, the line control unit including a current line control word register.

6. A timing generator according to claim 1, the arbitrator providing the line control unit higher priority over the frame control unit.

7. An imaging sensing system, characterized by:
an image sensor for temporarily buffering image data;
a data buffer for temporarily buffering the image data; and
a timing generator, the timing generator including:
- a line control unit configured to generate a first timing waveform for line read out of the image data from the image sensor;
- a frame control unit coupled to the line control unit and configured to generate a second timing waveform for frame read out of the image data from the image sensor, the frame control unit including a next frame control word register and a current frame control word register, the next frame control word register to buffer a next frame control word, the current frame control word register to buffer a current frame control word;
- a clock generator configured to provide a clock signal to the line control unit;
- a request arbitrator configured to arbitrate timing requests between the line control unit and the frame control unit based on an input; and
- a control word memory coupled to the request arbitrator and configured to provide a line control word to the line control unit or a frame control word to the frame control unit depending on an output from the request arbitrator, the line control word and the frame control word to control the first timing waveform and the second timing waveform, respectively.

wherein the next frame control word register and the current frame control word register provide the input.

8. An imaging sensing system according to claim 7, wherein the line control word for the line control unit and the frame control word for the frame control unit are of a same size.

9. An imaging sensing system, characterized by:
an image sensor for temporarily buffering image data;
a data buffer for temporarily buffering the image data; and
a timing generator, the timing generator including,
- a line control unit configured to generate a first timing waveform for line read out of the image data from the image sensor;
- a frame control unit coupled to the line control unit and configured to generate a second timing waveform for frame read out of the image data from the image sensor;
- a clock generator configured to provide a clock signal to the line control unit, the clock generator including first and second reload registers coupled to provide inputs to a multiplexer, the multiplexer providing an output to a down counter, the down counter coupled to provide a clock output,
- a request arbitrator configured to arbitrate timing requests between the line control unit and the frame control unit; and
- a control word memory coupled to the request arbitrator and configured to provide a control word to the line control unit or the frame control unit depending on an output from the request arbitrator.

10. An imaging system according to claim 7, wherein a portion of the next frame control word register and a portion of the current frame control word register is used to provide the input.

11. An imaging sensing system according to claim 7, the line control unit including a current line control word register.

12. An imaging sensing system according to claim 7, the arbitrator providing the line control unit higher priority over the frame control unit.

13. A timing generator for an imaging system, characterized by:
- a line control unit configured to generate a first timing waveform for line read out of image data from an image sensor;
- a frame control unit coupled to the line control unit and configured to generate a second timing waveform for frame read out of image data from an image sensor, the frame control unit including a next frame control word register and a current frame control word register, the next frame control word register to buffer a next frame control word, the current frame control word register to buffer a current frame control word;
- a control word memory configured to provide a line control word to the line control unit or a frame control word to the frame control unit, the line control word and the frame control word to control the first timing waveform and the second timing waveform, respectively; and
- an arbitration unit coupled to the line control unit, the frame control unit, and the control word memory, the arbitration unit configured to select which one of the line control unit or the frame control unit is active based on an input, wherein the next frame control word register provide and the current frame control word register the input.

14. A timing generator according to claim 13, wherein the line control word for the line control unit and the frame control word for the frame control unit are of a same size.

15. A timing generator according to claim 13, further including a clock generator coupled to the line control unit.

16. A timing generator, characterized by:
- a control word memory configured to provide a control word for a line control unit for outputting a first waveform and a frame control unit for outputting a second waveform;
- an arbitration unit coupled to the line control unit, the frame control unit, and the control word memory, the arbitration unit configured to select which one of the line control unit or the frame control unit is active; and
- a clock generator coupled to the line control unit, the clock generator including first and second reload registers coupled to provide inputs to a multiplexer, the multiplexer providing an output to a down counter, the down counter coupled to provide a clock output.

17. A timing generator according to claim 13, wherein a portion of the next frame control word register and a portion of the current frame control word register is used to provide the input.

18. A timing generator according to claim 13, the line control unit including a current line control word register.

19. A timing generator according to claim 13, the arbitration unit providing the line control unit higher priority over the frame control unit.

20. A timing generator according to claim 1, wherein the frame control unit further includes a next frame control word empty register configured to indicate when the next frame control word register is empty, the next frame control word empty register to provide an additional input for the input to the request arbitrator.

21. A timing generator according to claim 20, wherein the input to the request arbitrator includes a timing request from the frame control unit or the line control unit.

22. An imaging sensing system according to claim 7, wherein the frame control unit further includes a next frame control word empty register configured to indicate when the next frame control word register is empty, the next frame control word empty register to provide an additional input for the input to the request arbitrator.

23. An imaging sensing system according to claim 22, wherein the input to the request arbitrator includes a timing request from the frame control unit or the line control unit.

24. A timing generator according to claim 13, wherein the frame control unit further includes a next frame control word empty register configured to indicate when the next frame control word register is empty, the next frame control word empty register to provide an additional input for the input to the arbitration unit.

25. A timing generator according to claim 24, wherein the input to the arbitration unit includes a timing request from the frame control unit or the line control unit.

* * * * *